United States Patent
Nam et al.

(10) Patent No.: US 7,313,396 B2
(45) Date of Patent: Dec. 25, 2007

(54) REGISTERING MOBILE STATION IN PRIVATE MOBILE NETWORK COOPERATING WITH PUBLIC LAND MOBILE NETWORK (PLMN)

(75) Inventors: Hyun-Ho Nam, Suwon-si (KR); Dong-Youl Lee, Suwon-si (KR); Doo-Yong Yang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 60 days.

(21) Appl. No.: 11/108,721

(22) Filed: Apr. 19, 2005

(65) Prior Publication Data

US 2005/0277414 A1 Dec. 15, 2005

(30) Foreign Application Priority Data

Jun. 12, 2004 (KR) .................. 10-2004-0043336

(51) Int. Cl.
*H04Q 7/20* (2006.01)

(52) U.S. Cl. .................. 455/435.1; 455/435.2; 455/426.1; 455/462

(58) Field of Classification Search .............. 455/41.2, 455/426.1, 433, 435.1–435.3, 442, 443–444, 455/462; 370/338
See application file for complete search history.

(56) References Cited

U.S. PATENT DOCUMENTS

2004/0048624 A1* 3/2004 Ko et al. ............... 455/456.1

* cited by examiner

*Primary Examiner*—Erika A. Gary
(74) *Attorney, Agent, or Firm*—Robert E. Bushnell, Esq.

(57) ABSTRACT

Registering a Mobile Station (MS) in a private mobile network cooperating with a Public Land Mobile Network (PLMN) enables necessary MS information (IMSI/MIN and ESN) to be registered with an incoming call of the MS without a complicated procedure when the MS registers with the private mobile network and includes: receiving an Origination Message (ORM) transmitted from the MS through a private Base Transceiver Station (pBTS) included in the private mobile network; extracting a function code, a Mobile Directory Number (MDN), and MS information from the received ORM; examining MS registration information stored in the pHLR using the extracted MDN when the function code is a registration function code; and updating and registering the MS registration information using the extracted MS information when the examined MS registration information is in a registration initialization pattern.

9 Claims, 6 Drawing Sheets

| | | | |
|---|---|---|---|
| 51 — MS TEL | 7022 | NAME | |
| 52 — MDN | 0168707701 | ESN | — 53 |
| COS | 0 | DND | ▼ |
| TENANT | 0 | FMD TYPE | ▼ |
| HLR ID | 0 | FMD TEL | |
| PBM SYS ID | 0 | CID TYPE | MS TEL ▼ |
| | | ZONE DISPLAY | ZONE DISPLAY ▼ |
| | | [MS] | — 54 |

☐ HLR/VLR

BARRING STATE : NAME          BARRING STATE : NAME
MSC ID : None                  MSC ID : None Query  Delete

⊙ MS TEL    ○ NDN

[ Input D... [        ]  [SEND] ]  — 50

RX – [ QUERY ] HLR / VLR DB QUERY RESPONSE -- OK

FIG.5A

| | | | | |
|---|---|---|---|---|
| MS TEL | 7022 | NAME | | |
| MDN | 0168707701 | ESN | BO 15 75 FC | ~55 |
| COS | 0 | DND | OFF | |
| TENANT | 0 | FMD TYPE | | |
| HLR ID | 0 | FMD TEL | | |
| PBM SYS ID | 0 | CID TYPE | MS TEL | |
| | | ZONE DISPLAY | ZONE DISPLAY | |
| | | [HS] | 4500001687 07701 | ~56 |

BARRING STATE : NAME   BARRING STATE : NAME
MSC ID : None          MSC ID : None Query | Delete

⊙ MS TEL   ○ NDN

[ Input D... ]  [SEND]

RX - [ QUERY ] HLR / VLR DB QUERY RESPONSE -- OK

FIG.5B

REGISTERING MOBILE STATION IN PRIVATE MOBILE NETWORK COOPERATING WITH PUBLIC LAND MOBILE NETWORK (PLMN)

CLAIM OF PRIORITY

This application makes reference to, incorporates the same herein, and claims all benefits accruing under 35 U.S.C. §119 from an application entitled APPARATUS AND METHOD FOR REGISTERING MOBILE STATION IN PRIVATE MOBILE NETWORK COOPERATING WITH PUBLIC LAND MOBILE NETWORK filed with the Korean Intellectual Property Office on Jun. 12, 2004, and there duly assigned Serial No. 2004-43336.

BACKGROUND OF THE INVENTION

1. Field of the Invention

The present invention relates to registering a mobile station in a private mobile network cooperating with a Public Land Mobile Network (PLMN), and more particularly to registering an originating subscriber using a received origination message without a separate procedure in a private mobile network cooperating with a PLMN.

2. Description of the Related Art

In general, mobile communication networks may be classified into a PLMN and a private mobile network. Until the year 2000 in Korea, it was impossible for a PLMN and a private mobile network to cooperate with each other, and thus it was common that each subscriber could only use service provided from a network which the subscriber had joined. However, a system integrating the PLMN and the private mobile network began to be developed in earnest from the year 2000 and is now in common use.

A private mobile network cooperates with not only the PLMN, but also with a Public Switched Telephone Network And Integrated Services Digital Network (PSTN/ISDN) and an Internet Protocol (IP) network. The PLMN includes a plurality of Mobile Switching Centers (MSCs), a plurality of Base Station Controllers (BSCs) connected to the MSC, and a plurality of Base Transceiver Stations (BTSs) connected to a BSC. The BTS, which is a wire connection terminal, wirelessly communicates with the MSs. In addition, each of the MSCs includes a Home Location Register/visitor Location Register (HLR/VLR), thereby constituting an entire system.

The private mobile network cooperating with the PLMN includes a public/private communication service apparatus and a plurality of private BTSs (pBTS) cooperating with the public/private communication service apparatus, thereby providing a mobile communication service through the PLMN and the private mobile network to the MS which has joined the PLMN and the private mobile network. Also, the private mobile network is connected to the PSTN/ISDN and the IP network through the public/private communication service apparatus.

A first communication service area of a BTS in a PLMN system can be a dedicated public cell area arranged so that the first communication service area is separated from a second communication service area of a public/private shared cell area.

The public/private communication service apparatus includes a Private Branch Exchange (PBX), a private BSC (pBSC), and a private HLR (pHLR). The PBX includes a switch and an E1-interface, and the pBSC includes a pBTS Message Router (pBTMR) and a Transcoder and Selector Bank (TSB). The pBTMR is a module for routing all messages which must be processed by the pBTS 8-K. To be more specific, the pBTMR routes control messages for public/private incoming and outgoing call services of the MS with reference to an internal router table. Also, the pBTMR can route control messages of a PLMN including a BSC, an MSC, and a BTS used to provide incoming and outgoing call services for the MS in the dedicated public cell area and the MS in the public/private shared cell area.

While the MSC and each of the BSCs are connected to each other by a standard protocol, not only the pBSC and each of the BSCs but also the each of the BSCs and each of the BTSs are connected to each other by an interprocess communication scheme. The pBSC and the PSTN/ISDN communicate with each other by a T1 PRI (Primary Rate Interface), an E1 PRI, SS7, or the like, and the pBSC and the IP network communicate with each other by a TCP/IP (Transmission Control Protocol/Internet Protocol) or VoIP (Voice over Internet Protocol) scheme.

In order for an MS to be provided with services from both a PLMN and a private mobile network in the mobile communication system having a construction as described above, the MS must have been registered with both the PLMN and the private mobile network. For the register of the MS, a Mobile Directory Number (MDN), an International Mobile Station Identity (IMSI), a Mobile Identification Number (MIN), and an Electronic Serial Number (ESN) are used.

The MDN is a number used by the MS when a message is incoming/outgoing, the IMSI (or MIN) is a number used to distinguish MSs in the mobile communication system, and the ESN is a special serial number for distinguishing MSs. The MIN is included in the IMSI, and the IMSI or the MIN can be selectively used according to the requests of public mobile communication service providers.

When MS information is registered in the private mobile network cooperating with the PLMN, the MDN of which a relevant user is aware and a private mobile network number numbered by a private network manager can be directly registered. However, since the user does not know the IMSI (or MIN) and the ESN, it is necessary to ask a public mobile communication provider about registered user information or to find out the IMSI (or MIN) and the ESN by MS debug so as to register the IMSI (or MIN) and the ESN in the private mobile network.

In this case, since there are many various debugging schemes used according to MS manufacturers, it is impossible for a manager needing to register MSs to be fully aware of all debugging schemes used by the MS manufacturers. Also, querying the public mobile communication provider as to the IMSI (or MIN) of subscribers frequently occur for each site, thereby excessively increasing work load.

SUMMARY OF THE INVENTION

Accordingly, the present invention has been made to solve the above-mentioned problems occurring in the prior art, and an object of the present invention is to provide an apparatus and a method for registering a Mobile Station (MS) which enables MS information (IMSI/MIN and ESN), needed when the MS registers on a private mobile network cooperating with a public land mobile network, to be registered with an incoming call of the MS without a complicated procedure.

In accordance with one aspect of the present invention, a method is provided comprising: providing a private mobile communication system cooperating with a public land mobile network (PLMN); providing a private mobile network including a private Home Location Register (pHLR) and a private Base Station Controller (pBSC); registering a mobile station (MS) by the pBSC, the pHLR being arranged in the private mobile communication system and storing MS registration information of the MS to communicate with the private mobile communication system, the pBSC enabling the private mobile communication system to cooperate with the PLMN, the registering of the MS including: receiving an Origination Message (ORM) transmitted from the MS through a private Base Transceiver Station (PBTS) in the private mobile network; extracting a function code, a mobile directory number (MDN), and MS information from the received ORM; examining MS registration information stored in the pHLR using the extracted MDN upon the function code being a registration function code; and updating and registering the MS registration information using the extracted MS information upon the examined MS registration information being in a registration initialization pattern.

The MS information preferably comprises an International Mobile Station Identity (IMSI) and an Electronic Serial Number (ESN).

The MS information preferably alternatively comprises a Mobile Identification Number (MIN) and an Electronic Serial Number (ESN).

The method preferably further comprises sending a predetermined transmission sound to the MS when registration of the MS has been completed.

To accomplish this object, in accordance with another aspect of the present invention, an apparatus is provided comprising: a private mobile communication system cooperating with a public land mobile network (PLMN); a private mobile network including a private Home Location Register (pHLR) and a private Base Station Controller (pBSC), the pHLR being arranged in the private mobile communication system and storing MS registration information of an MS to communicate with the private mobile communication system, the pBSC enabling the private mobile communication system to cooperate with the PLMN; a data extraction unit adapted to extract a function code, a Mobile Directory Number (MDN), and MS information from an Origination Message (ORM) transmitted from the MS included in the private mobile network and received through a private base transceiver station (pBTS); a function code checking unit adapted to determine whether or not the function code extracted from the data extraction unit is a registration function code; and a control unit adapted to examine MS registration information stored in the pHLR using the MDN extracted from the data extraction unit and to update and register the MS registration information with the extracted MS information upon the examined MS registration information having a registration initialization pattern.

The MS information preferably comprises an International Mobile Station Identity (IMSI) and an Electronic Serial Number (ESN).

The MS information preferably alternatively comprises a Mobile Identification Number (MIN) and an Electronic Serial Number (ESN).

The apparatus preferably further comprises a confirmation tone transmission unit adapted to transmit a predetermined confirmation tone to the MS upon registration of the MS being completed.

The control unit preferably comprises: an examination section adapted to examine MS registration information stored in the pHLR using the MDN extracted from the data extraction unit; a pattern checking section adapted to determine whether or not the examined MS registration information is in a registration initialization pattern; and a registration section adapted to update and register the MS registration information with the extracted MS information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
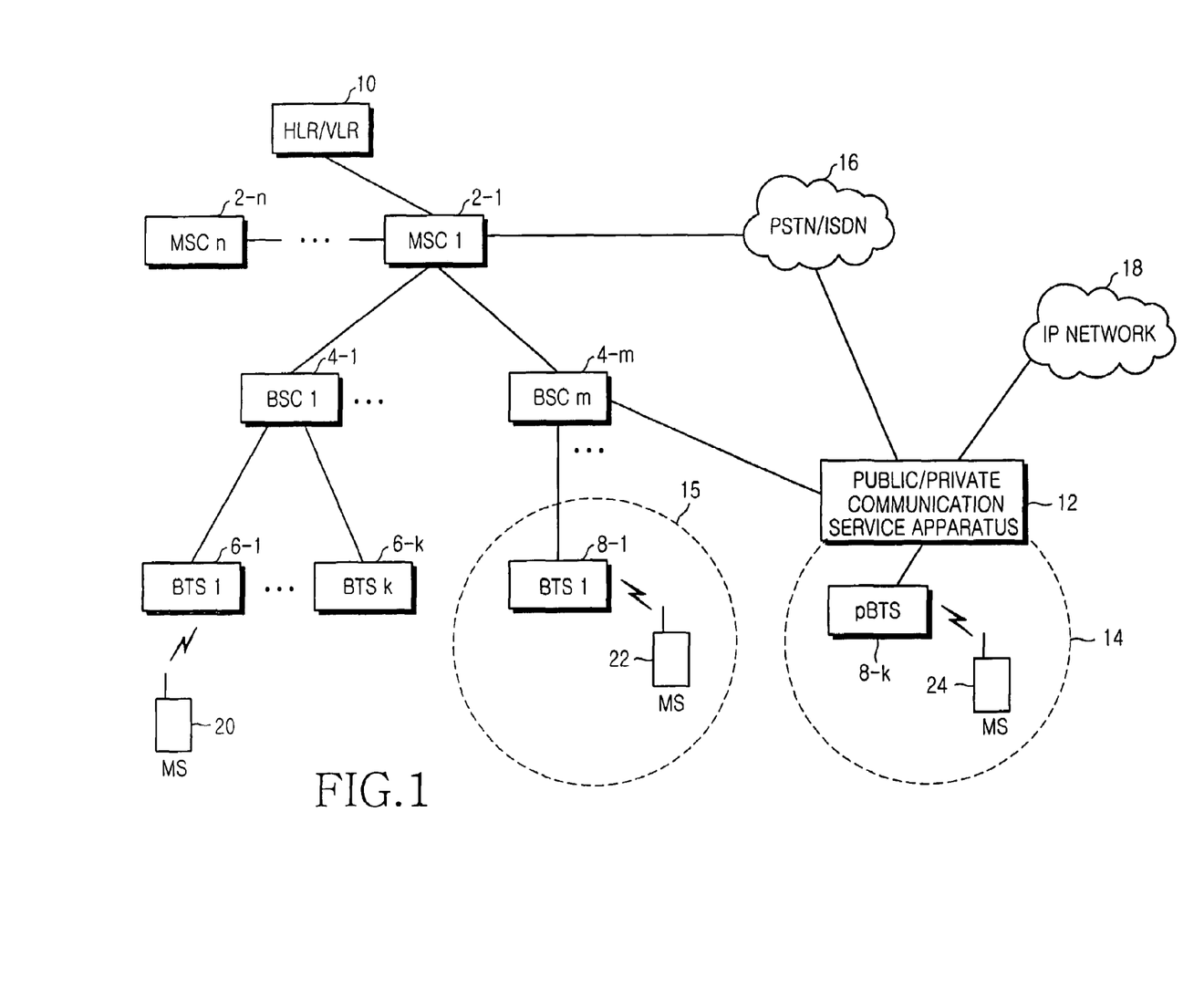
FIG. 1 is a block diagram of a private mobile network system cooperating with a PLMN.

FIG. 1 is a block diagram of a private mobile network system cooperating with a PLMN.

The private mobile network cooperates with not only the PLMN, but also with a Public Switched Telephone Network And Integrated Services Digital Network (PSTN/ISDN) 16 and an Internet Protocol (IP) network 18. The PLMN includes a plurality of mobile switching centers (MSCs) 2-1 to 2-N, a plurality of base station controllers (BSCs) 4-1 to 4-M connected to the MSC 2-1, and a plurality of base transceiver stations (BTSs) 6-1 to 6-K, and 8-1 connected to the BSC 4-1 or 4-M. The BTS, which is a wire connection terminal, wirelessly communicates with MSs 20, 22, and 24. In addition, each of the MSCs 2-1 to 2-N includes a Home Location Register/visitor Location Register (HLR/VLR) 10, thereby constructing an entire system.

The private mobile network cooperating with the PLMN includes a public/private communication service apparatus 12 and a plurality of private BTSs (pBTS) 8-K cooperating with the public/private communication service apparatus 12, thereby providing a mobile communication service through the PLMN and the private mobile network to the MS 24 which has joined the PLMN and the private mobile network. Also, the private mobile network is connected to the PSTN/ISDN 16 and the IP network 18 through the public/private communication service apparatus 12.

In FIG. 1, a first communication service area of the BTS 8-1 in a PLMN system is represented as a dedicated public cell area 15 so as to show that the first communication service area is separated from a second communication service area of a public/private shared cell area 14.

Figure 2:
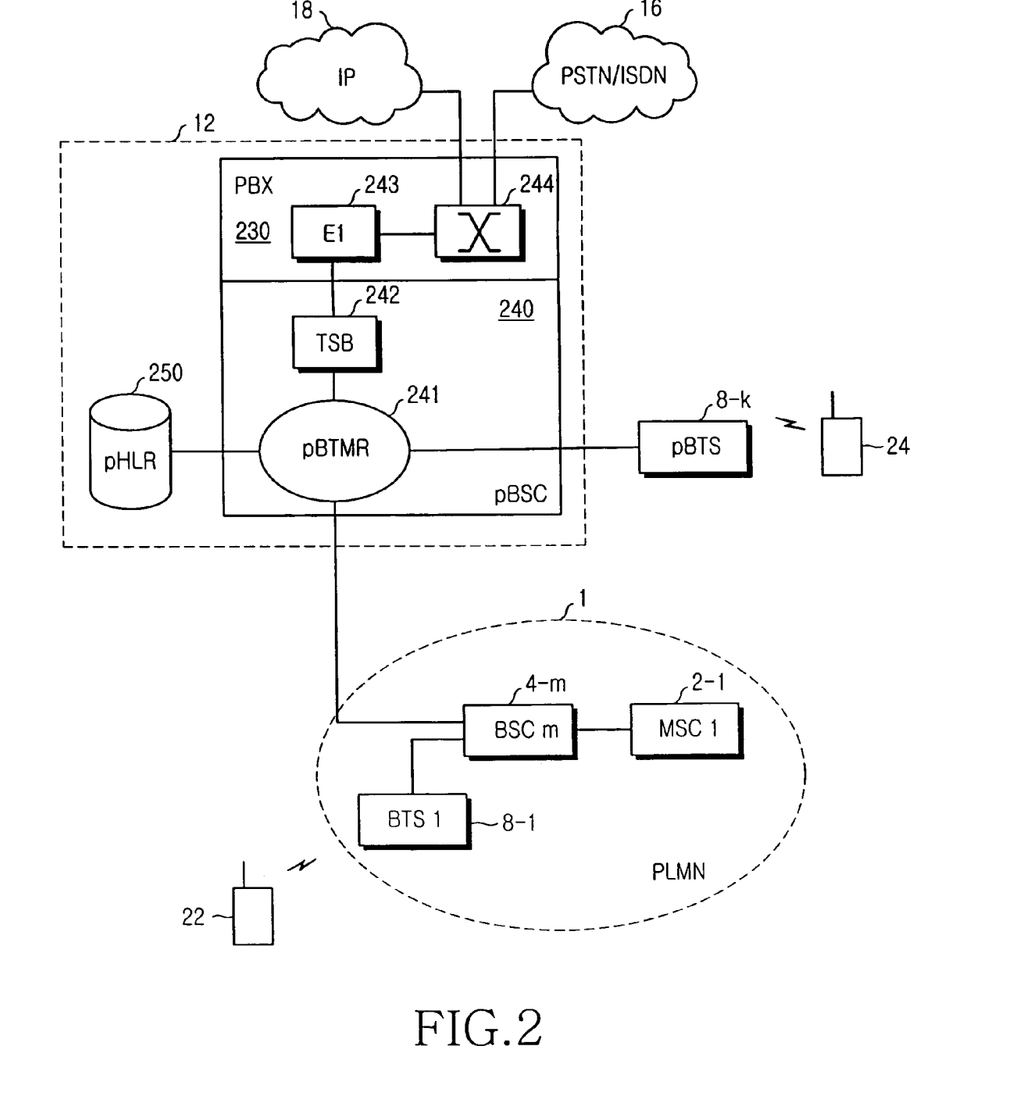
FIG. 2 is a block diagram of the public/private communication service apparatus of FIG. 1.

FIG. 2 is a block diagram of the public/private communication service apparatus 12 of FIG. 1.

The public/private communication service apparatus includes a Private Branch Exchange (PBX) 230, a private BSC (pBSC) 240, and a private HLR (pHLR) 250. The PBX 230 includes a switch 244 and an E1-interface 243, and the pBSC 240 includes a pBTS Message Router (pBTMR) 241 and a Transcoder and Selector Bank (TSB) 242. The pBTMR 241 is a module for routing all messages which must be processed by the pBTS 8-K. To be more specific, the pBTMR 241 is a software module which routes control messages for public/private incoming and outgoing call services of the MS 24 with reference to an interior router table. Also, the pBTMR 241 may route control messages of a PLMN 1 including a BSC 4-M, an MSC 2-1, and a BTS 8-1 which are used to provide incoming and outgoing call services for the MS 22 in the dedicated public cell area and the MS 24 in the public/private shared cell area 14.

While the MSC 2-1 and each of the BSCs 4-1 to 4-M are connected to each other by a standard protocol, not only the pBSC 240 and each of the BSCs 4-1 to 4-M but also the each of the BSCs 4-1 to 4-M and each of the BTS 6-1 to 6-K, and 8-1 are connected to each other by an interprocess communication scheme. The pBSC 240 and the PSTN/ISDN 16 communicate with each other by a T1 PRI (Primary Rate Interface), an E1 PRI, SS7, or the like, and the pBSC 240 and the IP network 18 communicate with each other by a TCP/IP (Transmission Control Protocol/Internet Protocol) or VoIP (Voice over Internet Protocol) scheme.

In order for an MS to be provided with services from both a PLMN and a private mobile network in the mobile communication system having a construction as described above, the MS must have been registered with both the PLMN and the private mobile network. For the register of the MS, a Mobile Directory Number (MDN), an International Mobile Station Identity (IMSI), a Mobile Identification Number (MIN), and an Electronic Serial Number (ESN) are used.

The MDN is a number to be used by the MS when a message is incoming/outgoing, the IMSI (or MIN) is a number used to distinguish MSs in the mobile communication system, and the ESN is a special serial number for distinguishing MSs. The MIN is included in the IMSI, and the IMSI or the MIN can be selectively used according to the requests of public mobile communication service providers.

When MS information is registered in the private mobile network cooperating with the PLMN, the MDN of which a relevant user is aware and a private mobile network number numbered by a private network manager can be directly registered. However, since the user does not know the IMSI (or MIN) and the ESN, it is necessary to ask a public mobile communication provider about registered user information or to find out the IMSI (or MIN) and the ESN by MS debug so as to register the IMSI (or MIN) and the ESN in the private mobile network.

In this case, since there are many various debugging schemes used according to MS manufacturers, it is impossible for a manager needing to register MSs to be fully aware of all debugging schemes used by the MS manufacturers. Also, querying the public mobile communication provider as to the IMSI (or MIN) of subscribers frequently occurs for each site, thereby excessively increasing work load.

Hereinafter, an embodiment according to the present invention will be described in detail with reference to the accompanying drawings. It is to be noted that the same elements are indicated by the same reference numerals throughout the drawings. In the following description of the present invention, a detailed description of known functions and configurations incorporated herein has been omitted when it may obscure the subject matter of the present invention.

Figure 3:
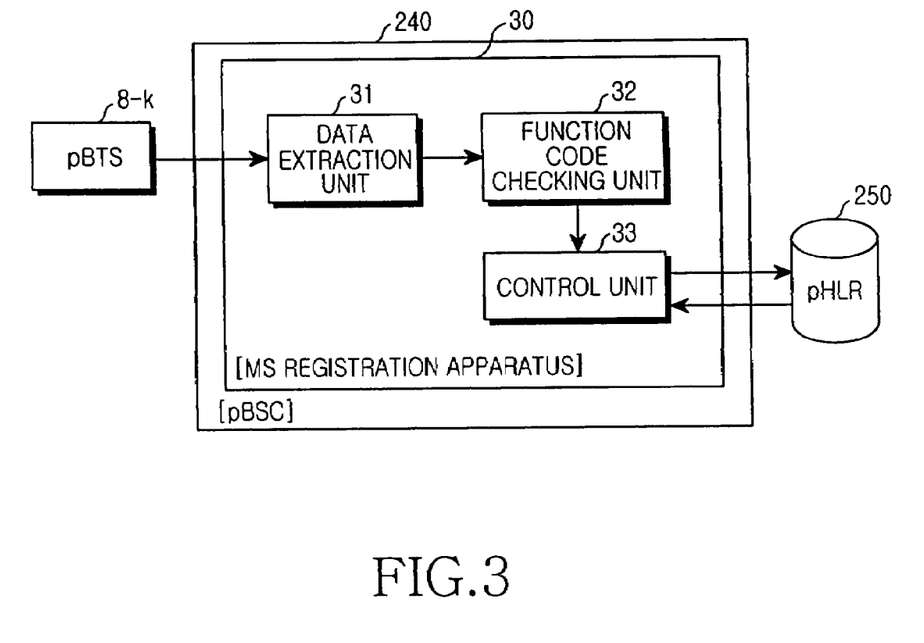
FIG. 3 is a block diagram of a Mobile Station (MS) registration apparatus according to an embodiment of the present invention.

FIG. 3 is a block diagram of an MS registration apparatus 30 according to an embodiment of the present invention.

A private Base Transceiver Station (pBTS) 8-K transmits an outgoing message from an MS 24 to a private base station controller (PBSC) 240 in a private mobile network. All of the messages transmitted to the pBSC 240 are routed by a pBTS Message Router (pBTMR) 241, which separates a public network call from a private network call, in the pBSC 240. An Origination Message (ORM) is also transmitted to the pBTMR 241.

The ORM is one of the messages transmitted from an MS to a BTS when the MS attempts a first call, and is defined in standard Spec. 3GPP2. TSG-C C.S0005, and includes a function code, an MDN, an IMSI or MIN, and an ESN. The function code and the MDN are numbers dialed by a user. For example, when a user dials "###0103003000", "###" is a function code and "0103003000" is an MDN.

A data extraction unit 31 extracts a function code, an MDN and MS information, needed for the registration of the MS on a private mobile network, from the ORM transmitted from the MS desiring to register, and transmits the extracted data to a function code checking unit 32. The MS information includes an IMSI (or MSI) and an ESN.

The function code checking unit 32 checks whether or not the function code of the data transmitted from the data extraction unit 31 is a registration function code, and transmits the data received from the data extraction unit 31 to a control unit 33 when the received function code is a registration function code.

The control unit 33 examines registration information of the MS stored in a pHLR 250 using the MDN of the data received from the function code checking unit 32, and updates and registers the examined MS registration information in the pHLR 250 using the MS information of the received data when the examined MS registration information is stored in a registration initialization pattern. All MS registration information includes at least an MDN and an extension number pre-stored by a private network manager, of which both the user and the manager are aware.

A state stored in a registration initialization pattern means that an IMSI (or MIN) and an ESN, except for the pre-stored MDN and the extension number, are not determined within MS registration information, in which a predetermined pattern (i.e., a specific pattern such as 'FFFFF') is stored in a data field of actual MS registration information. In this case, an IMSI (or MIN) and an ESN are represented as blanks on an interface.

The pHLR 250 stores MS registration information of a private mobile network 11 subscriber and location information thereof.

Hereinafter, MS registration service operations in a private mobile network cooperating with a PLMN will be described with reference to FIG. 4 according to an embodiment of the present invention. The MS registration apparatus shown in FIG. 3 can be realized by the pBTMR 241 included in the pBSC 240.

Figure 4:
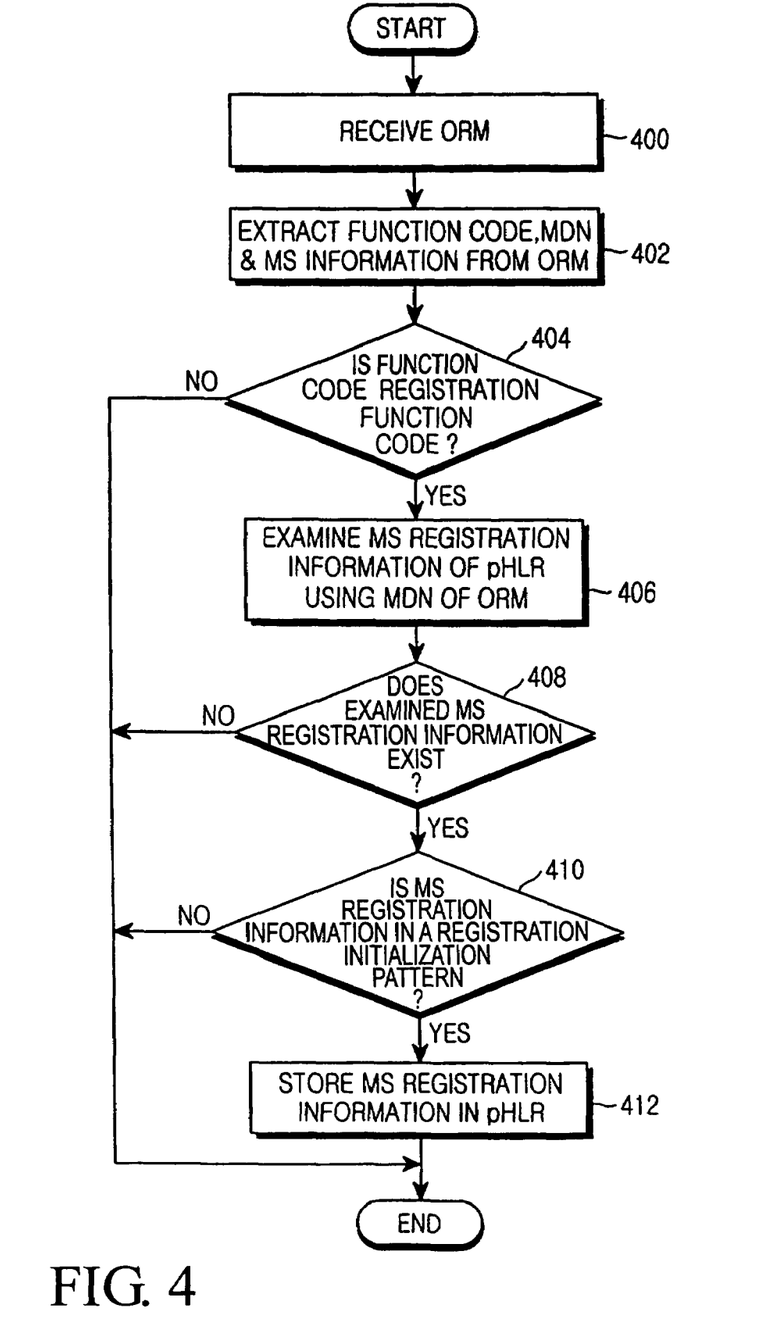
FIG. 4 is a flowchart of a method of registering an MS in a private mobile network cooperating with a PLMN according to an embodiment of the present invention.

FIG. 4 is a flowchart of a method of registering an MS according to an embodiment of the present invention.

In a private mobile network cooperating with a PLMN, the MDN and the extension number of an MS to be registered are stored in MS registration information of the pHLR 250 by a private network manager. When the MS desiring registration outputs a call including a function code and an MDN, the pBTS 8-K receives the call and transmits the received call to the pBSC 240. The pBSC 240 receives an ORM included in the call (step 400) and extracts the function code, the MDN, and MS information from the ORM (step 402). The MS information includes an IMSI (or MIN) and an ESN. In step 404, the pBSC 240 determines whether or not the function code of the extracted data is an MS registration function code. As a result, when it has been determined that the function code is an MS registration function code, the pBSC 240 examines MS registration information pre-stored in the pHLR 250 using the MDN of the extracted data (step 406). In contrast, when it has been determined that the function code is not an MS registration function code, an MS registering process according to the present invention ends. After step 406, a determination is made as to whether or not there is registration information about the relevant MS in the examined MS registration information (step 408). As a result, if it has been determined that there is registration information about the relevant MS, a determination is made as to whether or not the registration information about the relevant MS is in a registration initialization pattern (step 410), and if not, the MS registering process according to the present invention ends. When it has been determined in step 410 that the registration information about the relevant MS is in a registration initialization pattern in step 410, the registration information about the relevant MS without being specified in the MS registration information is updated with the extracted data and the registering process is completed (step 412). In contrast, when it has been determined in step 410 that the registration information about the relevant MS is not in a registration initialization pattern, the MS registering process according to the present invention ends.

Hereinafter, a detailed example of the MS registration method according to an embodiment of the present invention will be described.

In a case of desiring to use an MS using a number of '0163003000' in a PLMN in a private mobile network cooperating with the PLMN, a private network manager inputs '0163003000' used by the MS in the PLMN and a private network number (e.g., '2580') in MS registration information of the pHLR 250 so as to register the MS. Herein, the number of '0163003000' is an MDN.

When the MS outputs '###0163003000' obtained by combining '###' which is a registration function code and '0163003000' which is an MDN so as to register the MS, the pBTS 8-K receives the call and transmits the received call to the pBSC 240. The pBTMR 241 in the pBSC 240 receives an ORM included in the call. Herein, the ORM includes the function code, the MDN, an IMSI (or MIN), and an ESN.

TABLE 1

| Field | Value of Field |
|---|---|
| Function code | ### |
| MDN | 0163003000 |
| . . . | . . . |
| INSI (MIN) | 450000114004000 (0114004000) |
| ESN | B0 1575 FC |

Table 1 diagrammatically illustrates a format of the ORM. That is, Table 1 illustrates a case in which an MS using a number of '0163003000' changes the public network mobile communication service provider thereof through a change of a mobile station number and thus the value of the MIN field is set to be '0114004000'. The pBTMR 241 having received an ORM having the format as shown in Table 1 extracts the function code, the MDN, the IMSI (or the MIN), the ESN, which are necessary data fields. Then, a determination is first made as to whether or not the value of the function code field from among the extract data accords with the registration function code of '###' (which is only an example and by which the present invention is not limited). As a result, when it has been determined that the value of the function code field from among the extract data accords with the registration function code of '###', MS registration information pre-stored in the pHLR 250 is examined using '0163003000' which is the value of the MDN. When an according MS registration information is found and the according MS registration information is in a registration initialization pattern, that is, when values of an IMSI (or MIN) and an ESN in the according MS registration information are not determined, the MS registration information is updated with the extracted IMSI (or MIN) and ESN, thereby completing a relevant registering process. At this time, the private network may output a predetermined confirmation tone to notify the MS of the completion of registration.

Figure 5A:
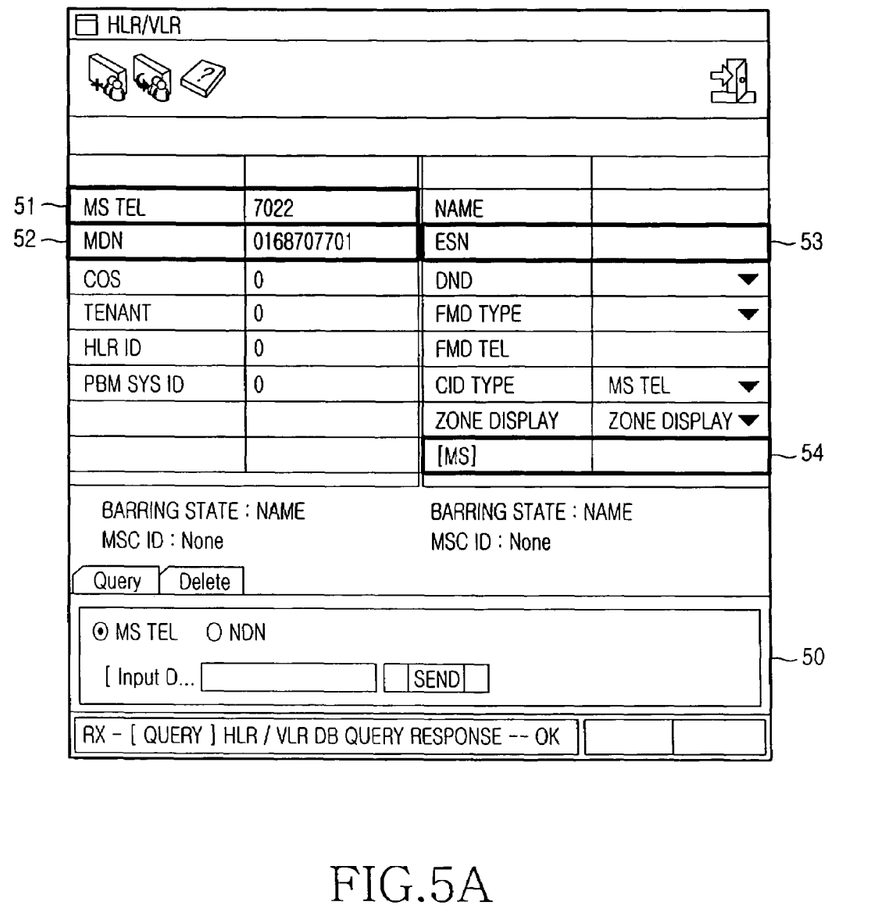
FIG. 5A is a view of a state of an initial MS registration information in a private Home Location Register (pHLR) before the MS is registered according to an embodiment of the present invention.
Figure 5B:
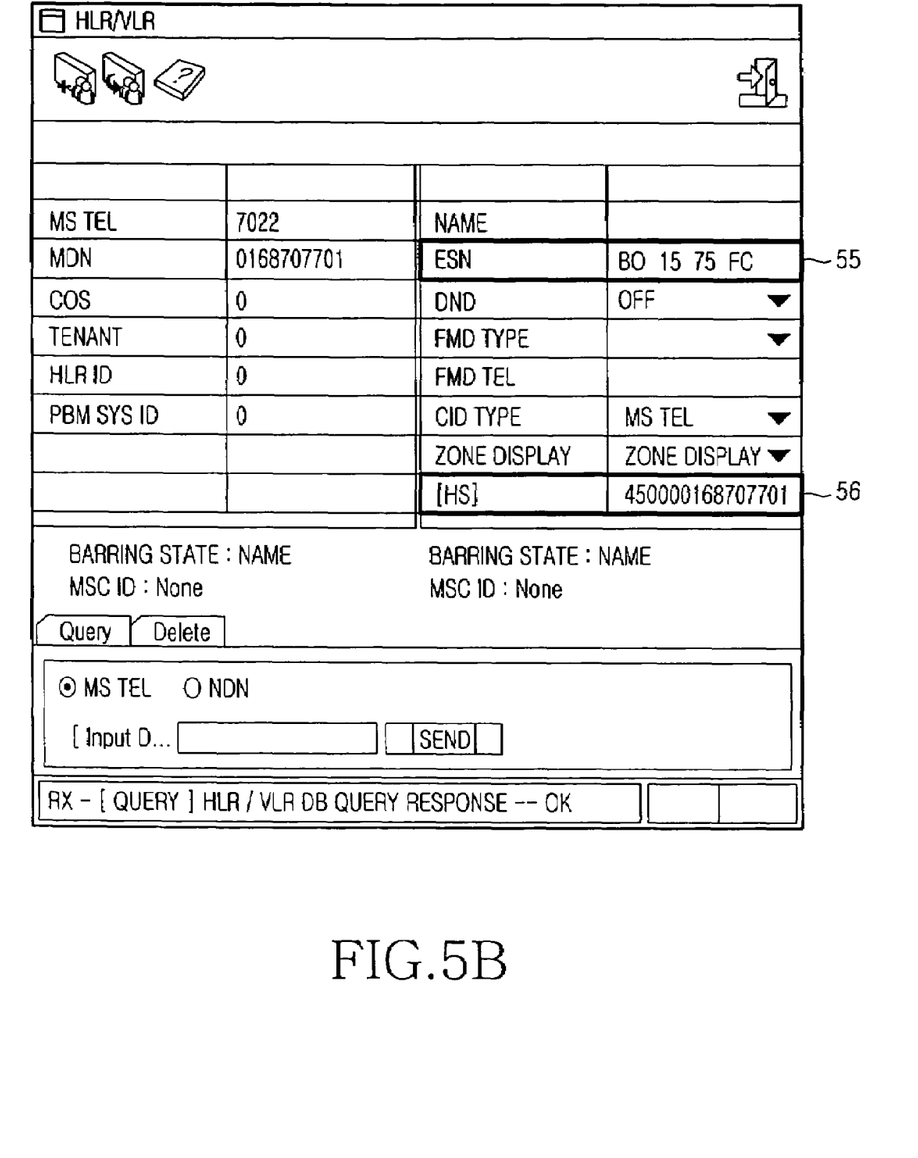
FIG. 5B is a view of a state of an MS registration information in a pHLR after the MS has been registered according to an embodiment of the present invention.

FIGS. 5A and 5B are views for explaining an interface of MS registration information stored in the pHLR 250 according to an embodiment of the present invention.

FIG. 5A shows a state of MS registration information which is in a registration initialization pattern before a relevant MS is registered, in which values of a private network number (MS TEL) 51 and an MDN 52 are stored but values of an ESN 53 and an IMSI 54 are not yet determined. In addition, FIG. 5A shows a case in which a relevant provider utilizes not an MIN but an IMSI as MS information.

To be more specific, an interface screen 50 for MS registration information of the pHLR 250 exists, in which items of information about an MS which has a number of '0169707701' as the MDN 52 and is assigned a number of '7022' as the private network number (MS TEL) 51 are stored by the private network manager. The ESN 53 and the IMSI 54 are not yet specified and remain blank on the interface. In this case, it is possible to utilize an MIN instead of the IMSI according to providers.

FIG. 5B shows a state in which the registration of the MS registration information existing in a state as described with reference to FIG. 5A is completed by the MS registration method of the present invention, in which the values of the IMSI and the ESN are updated, thereby enabling the MS to be used in the private mobile network cooperating with the PLMN.

To be more specific, the values of the ESN and the IMSI from among items included in the screen, which were not specified, are updated with an ESN value of 'B0 15 75 FC' and an IMSI value of '450000169707701' included in the ORN, so that the MS has been registered to be used in the private mobile network as well.

As described above, according to embodiments of the present invention, when an MS is registered on a private mobile network cooperating with a PLMN, it is possible to automatically determine an IMSI (or MIN) and an ESN (which are necessary information) by an originating call and to register the MS, without asking a public mobile communication provider nor performing an MS debug, thereby increasing the convenience of private network managers and decreasing management errors.

Although the present invention has been described with reference to the registration an MS on a private mobile network cooperating with a PLMN, it will be easily understood by those skilled in the art that the construction of the present invention can also be applied to a PLMN including a BTS, an HLR, and a BSC.

While the present invention has been shown and described with reference to certain embodiments thereof, it will be understood by those skilled in the art that various modifications in form and detail may be made therein without departing from the spirit and scope of the invention as defined by the appended claims.

What is claimed is:

1. A method comprising:
providing a private mobile communication system cooperating with a public land mobile network (PLMN);
the private mobile communication system including a private Home Location Register (pHLR) and a private Base Station Controller (pBSC);
registering a mobile station (MS) by the pBSC, the pHLR being arranged in the private mobile communication system and storing MS registration information of the MS to communicate with the private mobile communication system, the pBSC enabling the private mobile communication system to cooperate with the PLMN, the registering of the MS including:
receiving an Origination Message (ORM) transmitted from the MS through a private Base Transceiver Station (pBTS) in the private mobile network;
extracting a function code, a mobile directory number (MDN), and MS information from the received ORM;
examining MS registration information stored in the pHLR using the extracted MDN upon the function code being a registration function code; and
updating and registering the MS registration information using the extracted MS information upon the examined MS registration information being in a registration initialization pattern.

2. The method as claimed in claim 1, wherein the MS information comprises an International Mobile Station Identity (IMSI) and an Electronic Serial Number (ESN).

3. The method as claimed in claim 1, wherein the MS information comprises a Mobile Identification Number (MIN) and an Electronic Serial Number (ESN).

4. The method as claimed in claim 1, further comprising sending a predetermined transmission sound to the MS when registration of the MS has been completed.

5. An apparatus comprising:
a private mobile communication system cooperating with a public land mobile network (PLMN);
a private mobile network including a private Home Location Register (pHLR) and a private Base Station Controller (pBSC), the pHLR being arranged in the private mobile communication system and storing MS registration information of an MS to communicate with the private mobile communication system, the pBSC enabling the private mobile communication system to cooperate with the PLMN;
a data extraction unit adapted to extract a function code, a Mobile Directory Number (MDN), and MS information from an Origination Message (ORM) transmitted from the MS included in the private mobile network and received through a private base transceiver station (pBTS);
a function code checking unit adapted to determine whether or not the function code extracted from the data extraction unit is a registration function code; and
a control unit adapted to examine MS registration information stored in the pHLR using the MDN extracted from the data extraction unit and to update and register the MS registration information with the extracted MS information upon the examined MS registration information having a registration initialization pattern.

6. The apparatus as claimed in claim 5, wherein the MS information comprises an International Mobile Station Identity (IMSI) and an Electronic Serial Number (ESN).

7. The apparatus as claimed in claim 5, wherein the MS information comprises a Mobile Identification Number (MIN) and an Electronic Serial Number (ESN).

8. The apparatus as claimed in claim 5, further comprising a confirmation tone transmission unit adapted to transmit a predetermined confirmation tone to the MS upon registration of the MS being completed.

9. The apparatus as claimed in claim 5, wherein the control unit comprises:
an examination section adapted to examine MS registration information stored in the pHLR using the MDN extracted from the data extraction unit;
a pattern checking section adapted to determine whether or not the examined MS registration information is in a registration initialization pattern; and
a registration section adapted to update and register the MS registration information with the extracted MS information.

* * * * *